Oct. 21, 1952 — S. L. GOLDMAN — 2,614,353
DISPLAY MOUNT
Filed Feb. 28, 1949 — 2 SHEETS—SHEET 2
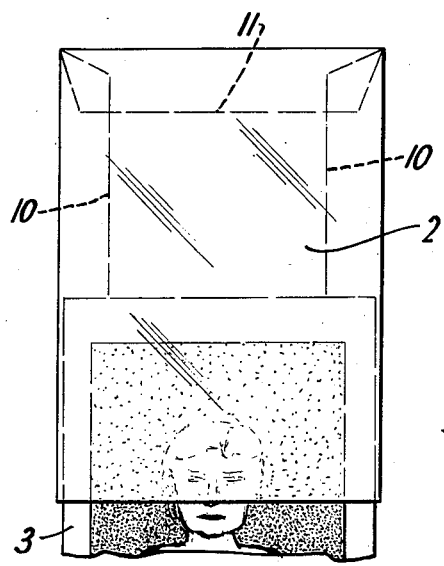
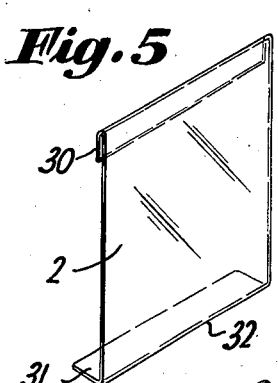
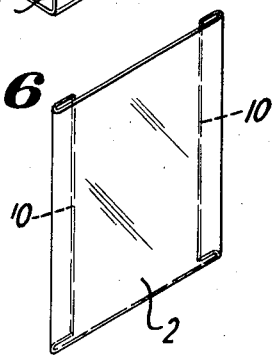
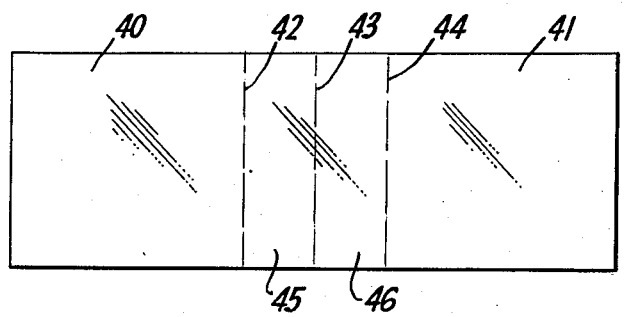
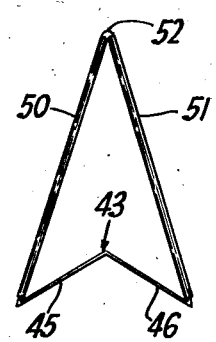
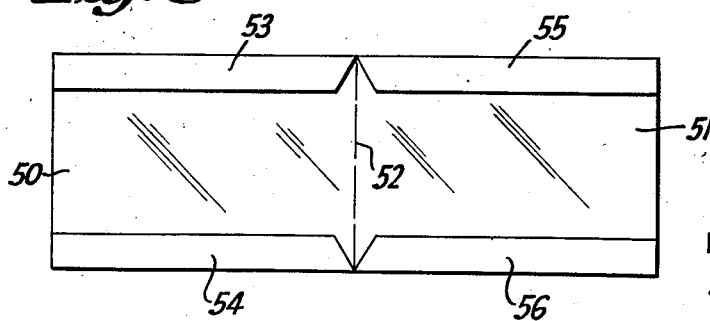
INVENTOR
SANFORD L. GOLDMAN
BY
Abraham S. Greenberg
ATTORNEY Patented Oct. 21, 1952

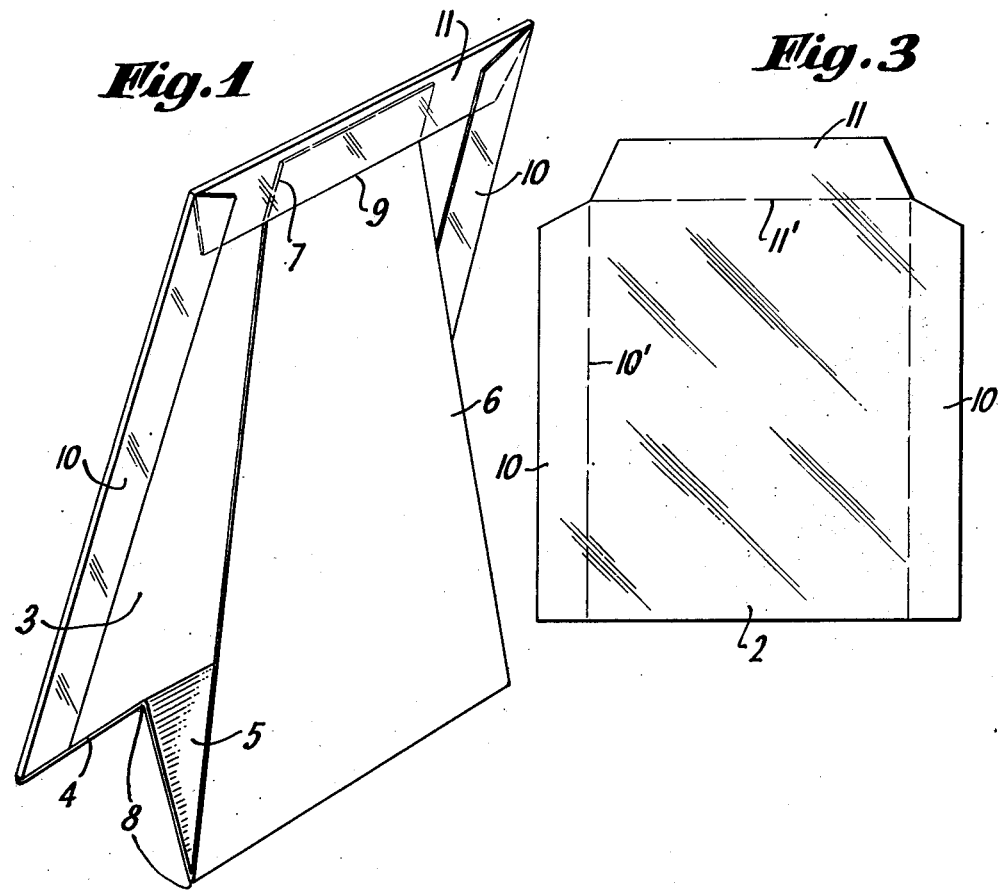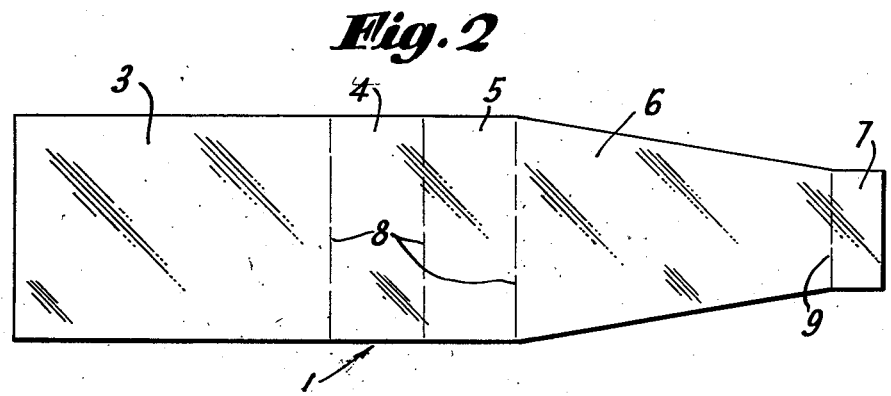

2,614,353

UNITED STATES PATENT OFFICE 2,614,353

DISPLAY MOUNT

Sanford L. Goldman, Long Beach, N. Y.

Application February 28, 1949, Serial No. 78,731

1 Claim. (Cl. 40—152.1)

My present invention relates generally to display mounts or picture frames provided with supports, and more particularly to improved and simplified easel type picture frames.

An important object of my present invention is to provide an easel type of picture frame or display mount, wherein the entire device consists of but two parts; the easel being provided by a one-piece foldable cardboard sheet, and the frame or cover by a sheet of transparent flexible material.

A more specific object of my invention is to provide an easel having a display support section, a back section and a hinged base section all formed from a single sheet; the support section carrying a transparent plastic cover provided with at least two biased flaps for retaining the cover on the support section.

Still other objects and advantages of my invention will become more apparent from a consideration of the following specification when read in the light of the accompanying drawings in which:

Fig. 1 is a perspective view of the rear side of a display mount showing the supporting section in its operative position;

Fig. 2 is a plan or development view of the one-piece mount or easel;

Fig. 3 shows the transparent plastic frame or cover prior to formation of the biased flaps;

Fig. 4 is a front view of the easel, part thereof being cut away, showing the transparent cover being slipped down into operative position;

Fig. 5 is a perspective view of the cover of the display mount showing a modified form of cover;

Fig. 6 is a perspective view of another modified cover;

Fig. 7 is a developed view of a modified mount;

Fig. 8 is a plan view of the modified cover inner face; and

Fig. 9 is a side view of the modified mount.

Referring now to the accompanying drawings, wherein like reference numerals in the several figures denote similar elements, the device shown in Fig. 1 consists of two components. In developed state, as shown in Figs. 2 and 3 respectively, the two components are seen to be a pair of single sheets. Sheet 1 may be composed of relatively thin cardboard, or other suitable flexible material, having a desirable finish as is customary in photographic or display mounts. Sheet 2 is the cover sheet, and is transparent plastic sheeting. Any other suitable flexible material may be used.

The cardboard strip or sheet 1 is divided into five panels or sections. The section or panel 3 is the picture or display surface; the rectangular sections 4 and 5 are of equal area and provide the hinged or foldable inverted V base shown in Fig. 1; the panel 6 is cut so as to taper towards the panel or tab 7; the tab 7 and panel 6 cooperate to provide a prop or support for the panel 3. The rectangular tab 7 is substantially narrower than panels 4 and 5; and the front panel 3 approximately equals the combined length of panel 6 and tab 7. The lateral lines 8 at the base are weakened lines to permit ready folding of the base panels into the inverted V position of Fig. 1. These weakened or score lines 8 are readily provided by suitable paper cutting devices. Similarly, the lateral line 9 is a weakened or score line to permit the tab 7 to be folded relative to prop panel 6.

The transparent flexible plastic cover sheet 2 generally has a length and width equal to that of display panel 3. However, the sheet 2 is provided with vertical side flaps 10, 10 and horizontal top flap 11. The dotted lines 10' and 11' represent the bias or fold lines for the side and top flaps. In other words, the rectangle within dotted lines 10', 10' and 11' is equal to the area of display panel 3. The sheet 2 is stamped or cut so as to provide flap extensions 10, 10 and 11. The flap extensions are folded over under suitable heat and/or pressure at lines 10', 10' and 11' to provide the biased gripping flaps 10, 10 and 11 shown in Fig. 1.

From Fig. 1 it is readily seen that the biased flaps 10, 10 provide grooves within which may be slid the vertical edges of display panel 3. The lateral top flap 11 acts as a stop for the lateral top edge of panel 3. In addition, the tab 7 is slid under the flap 11 so as to be retained thereunder. The flap 11 may overlie the upper ends of flaps 10, 10, or vice versa. In Fig. 1 the ends of flap 11 lie under the side flaps 10, 10.

Fig. 4 shows the manner of using the device. The display or picture 20 is placed on the display face of panel 3 (see Fig. 4), and the cover 2 is slid down over the panel 3. Of course, the tab 7 will be slid under lateral retaining flap 11 after the cover is slid down into its operative complete position on panel 3. The widths of flaps 10, 10 and 11 may be selected so as to provide a satisfactory frame or cover. Generally, the tab 7 will substantially fit under the entire flap 11.

If desired, the tab 7 may be cemented or pasted to the rear face of the upper edge of panel 3, This will not interfere with sliding of the cover 2 on, or from, the display panel 3. Further, the transparent cover 2 may be modified in the manner shown in each of Figs. 5 and 6.

In each of Figs. 5 and 6 the transparent plastic flexible cover sheet 2 need not be slid along the vertical edges of panel 3. Thus, the lateral top flap 30 in Fig. 5 corresponds to the flap 11, but the vertical side flaps 10, 10 are omitted. Instead, the bottom lateral flap 31 extends from the lower edge 32 of flexible sheet 2. The flap 31 extends at an angle to the plane of sheet 2 such that it corresponds to the angle between panel 3 and panel 4 in Fig. 1. In other words, the biased flap 31 is set to fit over the front support edge of the easel base. If desired, the flap 30 may be cemented or pasted in place over tab 7. In such case the picture will be placed on the display face of panel 3 by lifting the sheet at flap 31. Since the sheet 2 is flexible, it is readily lifted at flap 31 and the picture inserted under the cover sheet. Due to the bias line 32 the flap 31 will fit snugly when replaced over the leading edge of the base.

In Fig. 6 the cover sheet 2 is provided only with vertical side flaps 10, 10 which are, of course, biased into folded position. There is no top flap. In this case the tab 7 is cemented adjacent the top edge of panel 3. The cover of Fig. 6 fits over the vertical edges of panel 3 as shown in Fig. 1. However, to remove or locate a sheet under the cover, it is only necessary to lift one flap 10 off the panel 3 and bend the sheet vertically thereby to permit a picture to be located on the display face of panel 3. The lifted flap 10 is then slipped back into position.

It will be appreciated that the panels 3 and 6 are readily collapsed by merely pressing together at the lower edges of the panels. This pressure causes the angle of the inverted V to become more acute until it becomes substantially zero. The display mount is readily disassembled or assembled, and is highly economical to produce due to its minimum of elements.

In Figs. 7, 8 and 9 I have shown a modification which while employing but two elements, dispenses with tab 7. Further, there are two display panels. The transparent flexible plastic cover (Fig. 8) cooperates to maintain the easel assembled. In Fig. 7 the cardboard strip is divided in equal rectangular display panels 40, 41. The scored lines 42, 43, 44 provide the inverted V base panels 45 and 46. The transparent cover strip is divided into equal rectangular sections 50 and 51 by the pressed or bias fold line 52. Each cover section is provided with inwardly biased edge flaps. Thus, parallel edge flaps 53, 54 are provided on the inner face of panel or section 50. Biased edge flaps 55 and 56 are provided on the inner face of section 51. The inner ends of the edge flaps are cut as shown in Fig. 8. The cover sections 50, 51 are slid into cover positions on respective panels 40 and 41 with ease, since the width of the panels 40, 41 is such as to permit each panel to slide between, and within, the biased edge flaps of each display panel. The cover sections 50, 51 retain the easel (Fig. 9) in assembled condition.

What I claim is:

A display mount consisting of two elements, one element being a cardboard blank scored along three parallel lines in the center region thereof to provide a display panel section, an inverted V base section and a prop section terminating in a tab, the outer two of said scored lines being substantially equally distant from the center scored line, the length of said display panel section being substantially equal to the length of said prop section including said tab, said prop section tapering in width from the scored line defining the wide end thereof to the tab defining the narrow end thereof, said tab also having a scored line near the free end of said prop section to enable easy bending of said tab, the second element being a flexible sheet of transparent cover material having a top flap foldable over the top horizontal edge of the display panel and two side flaps to grip opposed vertical edges of the display panel, said tab being located at the rear face of the display panel top edge underneath the top flap of the cover material and adapted to be retained freely of said display panel section and underneath said top flap in such manner that said cover holds said display mount in assembled condition.

SANFORD L. GOLDMAN.

REFERENCES CITED

The following references are of record in the file of this patent:

UNITED STATES PATENTS

| Number | Name | Date |
|---|---|---|
| 760,935 | Strauss | May 24, 1904 |
| 1,521,670 | Bridges | Jan. 6, 1925 |
| 1,524,338 | Chesney | Jan. 27, 1925 |
| 1,851,917 | Maggio | Mar. 29, 1932 |
| 2,219,492 | Prichap | Oct. 29, 1940 |
| 2,434,860 | Oxley | Jan. 20, 1948 |
| 2,480,918 | Goldman | Sept. 6, 1949 |